Aug. 1, 1939.  K. SAUR  2,168,106
APPARATUS FOR MEASURING THE QUANTITY OF FLUID IN VESSELS OR CONTAINERS
Filed June 17, 1937
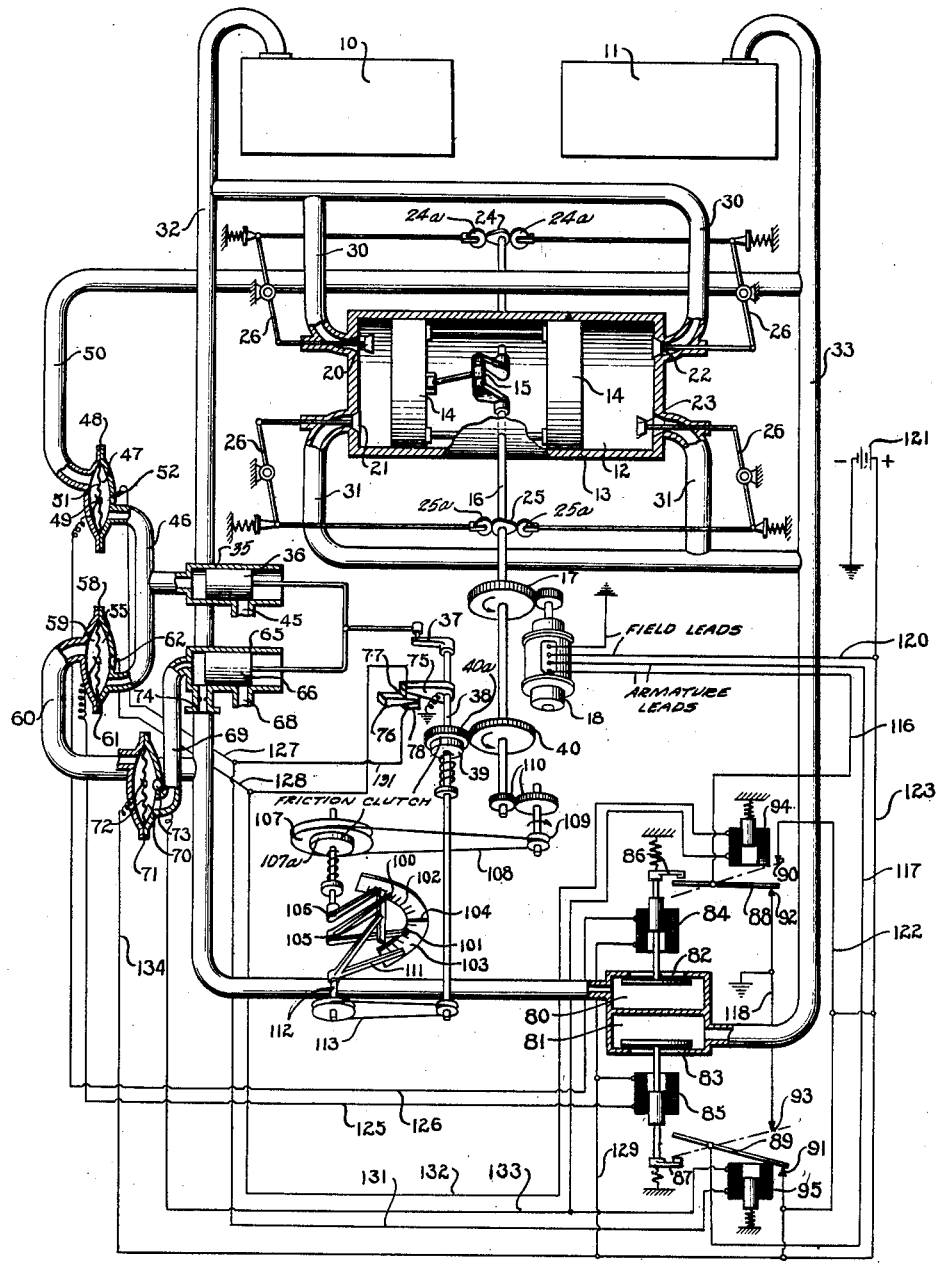
INVENTOR.
Karl Saur
BY
Stephen Cerstvik
ATTORNEY.

Patented Aug. 1, 1939

2,168,106

UNITED STATES PATENT OFFICE 2,168,106

APPARATUS FOR MEASURING THE QUANTITY OF FLUID IN VESSELS OR CONTAINERS

Karl Saur, Berlin-Reinickendorf, Germany, assignor to Siemens Apparate und Maschinen Gesellschaft mit beschränkter Haftung, Berlin, Germany, a corporation of Germany Application June 17, 1937, Serial No. 148,803
In Germany June 18, 1936

15 Claims. (Cl. 73—290)

This invention relates to apparatus for measuring the quantity of fluid in vessels or containers and more particularly to a system for measuring the contents of a pair of containers such as gasoline tanks which may be located in opposite wings of an airplane or the like.

An object of the invention is to provide a system of the above type in which the contents of the container are determined by measuring the quantity of air supplied thereto for raising the air pressure in the container to a predetermined value.

Another object is to provide a system of the above type in which variations due to changes in atmospheric pressure are eliminated.

Another object is to provide a system in which the air for measuring purposes is pumped from one of the containers to the other, so that a loss of gasoline vapors which may be contained therein is avoided.

Various other objects and advantages will be apparent as the nature of the invention is more fully disclosed.

Although the novel features which are believed to be characteristic of this invention will be particularly pointed out in the claims appended hereto, the invention itself will be better understood from the following description taken in connection with the accompanying drawing in which a preferred embodiment thereof has been set forth for purposes of illustration.

The figure of the drawing is a diagrammatic representation of a system embodying the present invention.

Referring to the drawing more in detail, the invention is shown as applied to an apparatus for measuring the contents of a pair of containers 10 and 11 which may represent gasoline tanks mounted for example in the two wings of an airplane. For supplying air under pressure to the containers 10 and 11 for measuring purposes there is provided a reversible, double-acting pump 12 diagrammatically shown as comprising a cylinder 13 containing a piston 14 driven by a crank 15 secured to a drive shaft 16, which in turn is driven through gears 17 by a reversible electric motor 18. The pump 13 is provided with a plurality of valves 20 to 23 which are mechanically operated by means of cams 24 and 25 mounted on the shaft 16 and connected to the valves by means of spring urged followers 24a and 25a respectively carried by suitable linkages 26. These valves control ports leading to pipes 30 and 31 which communicate respectively with ducts 32 and 33 leading to the containers 10 and 11, respectively. The pump 12 is so designed that air is pumped from container 10 to container 11 or vice versa, depending upon the direction of the rotation of the motor 18 and the shaft 16.

For obtaining a standard pressure to be used for purposes of comparison, there is provided a standard compressor 35 having a piston 36 driven by a crank 37 which is mounted on a shaft 38 actuated from the drive shaft 16 by means of a slip clutch 39 through gear 40 and gear 40a mounted loosely on shaft 38. When the piston 36 is in retracted position, the compressor 35 is open to the atmosphere through a vent 45. When the piston 36 is in its forward position, as shown, the air which is compressed therein is supplied by means of a pipe 46 to one chamber 47 of a manometer 48, the other chamber 49 of which is connected by a pipe 50 to the duct 33 so as to be maintained at the pressure of the container 11. The manometer 48 is provided with a diaphragm 51 separating the chambers 47 and 49 and is adapted normally to close a contact 52 when the pressure within the chamber 47 is equal to or less than that within the chamber 49.

The pipe 46 also communicates with the chamber 55 of a manometer 58 having a second chamber 59 connected by a pipe 60 with the duct 32 so as to be maintained at the pressure of the container 10. The chambers 55 and 59 are separated by a diaphragm 61 which is adapted to close a contact 62 when the pressure within the chamber 55 is equal to or less than that within the chamber 59. The diaphragms 51 and 61 may be spring pressed so as to maintain proper contact under the conditions specified. These manometers are arranged, as will be described, so that a standard pressure is developed within the chambers 47 and 55 by the action of the compressor 35 which serves to break the contacts 52 and 62 until the pressure in the container 10 or 11 has been built up to a corresponding value by the pump 12. These contacts are connected, in the manner to be described, so as to interrupt the operation of the motor 18 when the pressure has been built up in the container 10 or 11 to the value of the standard pressure.

There is also provided a timing device which comprises a cylinder 65 having a piston 66 connected to the crank 37 for operation with the piston 36. The cylinder 65 is vented to the atmosphere by means of a vent 68 and is connected by a pipe 69 to the chamber 70 of a manometer 71 having a diaphragm 72 which is adapted to close a contact 73 when the pressure within the chamber 70 is less than a determined value. A vent 74 is provided for gradually releasing the air from the chamber 70 so that the contact 73 closes a predetermined time interval after the piston 66 has been actuated. This timing device is used for restarting the motor 18 in the opposite direction after the operation thereof has been interrupted by the manometers 48 and 58. It is to be understood, however, that any other suitable timing device such as a contact-clock may be used in place of the manometer 71, if desired.

The stroke of the pistons 36 and 66 is limited by means of an arm 75 carried on the shaft 38 cooperating with a stop member comprising a block 76 carrying upper and lower contact members 77 and 78, respectively, which are adapted to engage said arm 75 so as to limit the movement thereof.

The ducts 32 and 33 communicate with valve chambers 80 and 81 having valves 82 and 83, respectively, which vent to the atmosphere. These valves are controlled by solenoids 84 and 85, respectively, which are adapted, when energized, to open the corresponding valve and when de-energized to permit said valves to close. The solenoids 84 and 85 are also provided with arms 86 and 87 which are adapted to actuate motor control switches 88 and 89, respectively, when the solenoids are energized. The switches 88 and 89 are provided with back contacts 90 and 91 which are closed by actuation of the arms 86 and 87 above mentioned and with front contacts 92 and 93, which are adapted to be closed by starting relays 94 and 95, respectively, said starting relays, when energized, being adapted to shift the switches 88 and 89, respectively, into the positions specified.

For indicating the measurement values there is provided an indicating device which in the form shown comprises a pair of pointers 100 and 101 cooperating with scales 102 and 103, respectively. These pointers are adapted to maintain a central position indicated by the mark 104 on the scale when the containers 10 and 11 are full. The pointers are shifted from this central position as the operation of the device indicates the lowering level of the liquid within the containers 10 and 11 by means of a driver 105 mounted on a shaft 106 carrying slip clutch 107a driven by loose pulley 107 driven by a belt 108 engaging a corresponding pulley 109 which is driven by a gear train 110 from the shaft 16, so that the movement of the driver 105 is a measure of the number of revolutions of the shaft 16 and, consequently, of the amount of air supplied to the container being measured. For returning the driver 105 to neutral position after each measurement has been taken, there is provided a forked arm 111 mounted on a shaft 112 and driven by a belt 113 from the shaft 38.

The motor 18 is provided with reversing armature windings which are connected by leads 116 and 117 to switches 88 and 89, respectively, the front contacts 92 and 93 of which are connected by a lead 118 to ground. The lead 120 from one side of the field of motor 18 is connected to a source of current supply 121. The back contacts 90 and 91 of the switches 88 and 89 are connected by a lead 122 to a line 123 leading to the source of current supply 121. The arrangement is such that with the switches in the position shown with the front contact 92 of the switch 88 closed and the back contact 91 of the switch 89 closed, operating current is supplied to the motor armature through the leads 117 and 116, respectively, thereby causing the motor 18 to operate in a given direction. When the solenoid 84 has operated to open the contact 92 and close the contact 90 of the switch 88, the motor armature windings are short circuited by the lead 122 and the motor is stopped. When the relay 95 operates to open the contact 91 and close the contact 93 of the switch 89, the armature of the motor 18 is energized by means of the leads 117 and 116 respectively and the motor is caused to operate in the reverse direction until the operation is again interrupted due to short circuiting of the windings by actuation of the solenoid 85.

The solenoids 84 and 85 are connected by leads 126 and 125, respectively, to the diaphragms 51 and 61 of the manometers 48 and 58, thence through contacts 52 and 62 by leads 127 and 128 to contact members 78 and 77, respectively, thence through the arm 75 to ground. The return lead 129 from the solenoids 84 and 85 is connected through the line 123 to the source of potential 121.

The relay 95 and 94 are connected by leads 131 and 132, respectively, to contact members 78 and 77. The return lead 133 of the relays 95 and 94 is connected to the contact 73 of the manometer 71 and thence through lead 134 and line 123 to the source of potential 121.

While the arm 75 and the source 121 have been shown as grounded, it is to be understood that in the case of an airplane this ground return may be replaced by a metallic connector.

The operation of the device above described is as follows:

By means of normal air leakage when the apparatus is allowed to stand for a period of time or by other means, the pressure to the left of piston 35 will become that of the atmosphere.

Assuming then, that the entire system is at atmospheric pressure and that the device is starting from rest at the beginning of the measuring operation; contacts 52, 62 and 73 of the manometers 48, 58 and 71 are closed inasmuch as the pressure is equalized on both sides of the corresponding diaphragms; the solenoid 84 is de-energized since the arm 75 is out of contact with the contact member 78; and the valve 82 is closed. The solenoid 85 is energized because the contact 62 is closed and the arm 75 is in contact with the contact member 77 as illustrated. This solenoid 85 has, accordingly, been actuated to open the valve 83 which maintains the container 11 at atmospheric pressure. The relay 94 is energized through the contact member 77 and arm 75 and also the contact 73 to close the contact 92 and start the motor 18. When the motor starts to operate, the shafts turn in the direction of the arrow, thereby causing the arm 75 to break contact with the contact member 77 which deenergizes the solenoid 85 and permits the valve 83 to close. The arm 75 continues to rotate until it engages the contact member 78. During this rotation of the arm 75, the pistons 36 and 66 have gone through a complete cycle, being first retracted to vent the compressor 35 and the cylinder 65 to the atmosphere and then advanced to compress the air within the compressor 35 and the cylinder 65, respectively, thereby building up air pressure in the manometers 48, 58 and 71 which opens the contacts 52, 62 and 73, respectively.

This rotation of the shaft 38 also moves the forked arm 111 a distance adapted to bring the driver 105 into central position. Thereafter the friction clutch 39 slips, permitting the pump 12 to continue operation without causing further movement of the shaft 38.

The continued operation of the pump 12 serves to pump air from the container 10 into the container 11 so as to compress the air within the latter. At the same time, the shaft 16 actuates the driver 105 for pushing the pointer 101 along the corresponding scale 103. This operation continues until the pressure within the container 11 becomes equal to the pressure within the chamber 47 of the manometer 48. When this occurs, the contact 52 closes. Since the arm 75 is now making contact with the contact member 78, this closure of the contact 52 completes the circuit to the solenoid 84 which is thereupon actuated to open the valve 82 and also to actuate the switch 88 so as to open the contact 92 and close the contact 90. Closure of the contact 90 serves to short circuit the windings of the motor 18 and to bring the same to a stop.

This operation, in addition to stopping the motor 18, by opening the valve 82 ensures atmospheric pressure in the container 10 so that at the next operation of the system the quantity of liquid within that container may be measured. It will be noted that the number of revolutions of the shaft 16 required in bringing the container 11 to the pressure corresponding to the standard pressure developed by the compressor 35 is measured by the movement of the driver 105 from its central position. The position of the pointer 101 on the scale 103 accordingly serves as an indication of the liquid level in the container 11.

During this period of operation, the air compressed within the cylinder 65 has slowly leaked out through the port 74, thereby permitting the contact 73 to again close. Closure of the contact 73, the arm 75 being in contact with the contact member 78, energizes the relay 95, thereby reversing the position of the switch 89, opening the contact 91 and closing the contact 93. This causes the motor 18 to begin to rotate in the reverse direction. The timing of the operation of the relay 95 may be controlled by varying the size of the port 74 so as to allow sufficient time for the complete operation of the registering device before the motor 18 is again started in operation. The system is now ready to measure the liquid level in the container 10. As the operation begins, the shaft 38 is rotated a complete revolution to bring the arm 75 into contact again with the contact plate 77 as shown in the drawing. This also produces a full cycle of the pistons 36 and 66 and again supplies pressure to the manometers 48, 58 and 71 for breaking the contact and maintaining contact 62 in open position. The forked arm 111 also moves in the proper direction to return the driver 105 to a central position. As soon as rotation of the shaft 38 has begun, the arm 75 leaves the contact member 78, thereby deenergizing the solenoid 84 and the relay 95. Deenergization of the solenoid 84 closes the valve 82 which permits pressure to be built up in the container 10.

The operation of the pump 13 now continues until the container 10 is charged to a pressure corresponding to that produced in the compressor 35, at which time the contact 62 of the manometer 58 closes. This actuates the solenoid 85 since 75 contacts 77 for operating the switch 89 so as to open the contact 93 and close the contact 91, thereby short circuiting the motor winding and bringing the motor to rest and at the same time opens the valve 83 to vent the container 11 to the atmosphere. The system is thus brought to rest with the pointer 100 pushed by the driver 105 into a position corresponding to the quantity of air which was supplied to the container 10. Shortly thereafter contact 73 of the timing manometer again closes thereby actuating the relay 94 to reverse the position of the switch 88 to that shown in the drawing and again start the motor 18 in operation in a direction to supply air to the container 11.

It is evident that the device is alternately operated, first in one direction, then in the other, to measure the liquid level in the two containers 10 and 11. The pointers 100 and 101 indicate this liquid level by their position on the scales 102 and 103. Furthermore, it is to be noted that at the beginning of each operation the container to be measured is vented through the valve 82 or 83 and the compressor 35 is later vented to the atmosphere when the piston 36 is retracted and just prior to the compression stroke, thereby assuring that the same atmospheric pressure exists in both of these members. Irregularities due to variations in atmospheric pressure are thus eliminated. At each operation, a standard pressure is built up in the compressor 35 and air is charged into the container being measured until the pressure therein equals the standard pressure built up by this compressor. The movement of the driver 105 measures the quantity of air thus required to establish the standard pressure within the containers. Since this quantity of air is dependent upon the space within the container, the measurement taken is an indication of the liquid level therein. The venting of each of the containers to the atmosphere just prior to the measuring operation also permits air to be supplied thereto to replace the liquid which has been withdrawn since the previous measuring operation.

It will be noted that the air for compression is supplied from one container to the other and is not discharged into the atmosphere. In this way, the gasoline vapor or the like which may be present in the air is retained in the system. When the containers are to be filled, the entire unit is deenergized to prevent air from being pumped into the containers and escaping through the filler opening. When the system is again energized, the mechanism automatically begins operation as above mentioned. It is, of course, necessary to reset the pointers 100 and 101 to central position when the containers are filled so that they can again be moved along the scale to the proper point by the driver 105.

If at the beginning of the operation, the arm 75 is not in contact with one of the contact members 77 and 78, but is in some intermediate position, then the first operation will rotate the shaft 38 in one direction or the other until arm 75 makes contact. If this operation has caused less than a full stroke of the piston 36, the proper standard pressure may not have been built up within the compressor 35. In that event, the proper solenoid and relay are operated to stop and then reverse the direction of rotation of the motor 18 in the manner above described before the proper pressure is built up in the particular tank. Thereafter, however, the operation proceeds in the normal manner.

It will be noted that the above described system is adapted to accurately measure the liquid level in a container by measuring the quantity of air supplied thereto to raise the pressure to a given standard pressure which standard is made to vary with the absolute atmospheric pressure to which the entire system is subjected whereby the measurement is made independent of the absolute atmospheric pressure.

A specific embodiment of the invention is shown and described for purposes of illustration. It will be obvious, however, that various changes and modifications may be made therein as will be apparent to a person skilled in the art.

What is claimed is:

1. An apparatus for measuring liquid level in a closed container, which comprises a compressor adapted to compress a given quantity of air so as to obtain a standard pressure, a pump connected to pump air into said container to build up the pressure therein, means responsive to the pressure in said container for interrupting the operation of said pump when said pressure becomes equal to said standard pressure and means to measure the quantity of air supplied by said pump as an indication of the liquid level in said container.

2. An apparatus for measuring the liquid level in a closed container, which comprises a compressor adapted to compress a given quantity of air from atmospheric pressure so as to produce a standard pressure, means initially establishing atmospheric pressure in said container, a pump connected to supply air to said container to build up the pressure therein, means to compare said last pressure with said standard pressure, and means to interrupt the operation of said pump when the pressure in said container is equal to said standard pressure.

3. An apparatus for measuring the liquid level in a closed container, which comprises a compressor adapted to compress a given quantity of air from atmospheric pressure so as to produce a standard pressure, means initially establishing atmospheric pressure in said container, a pump connected to supply air to said container to build up the pressure therein, means to compare said last pressure with said standard pressure, means to interrupt the operation of said pump when the pressure in said container is equal to said standard pressure and means to measure the total amount of operation of said pump as an indication of said liquid level.

4. An apparatus for alternately measuring the liquid level in a pair of closed containers, comprising a pump connected to pump air from one container to the other to build up a predetermined pressure therein and vice versa and means to measure the total amount of operation of said pump required in building up said pressure.

5. An apparatus for alternately measuring the liquid level in a pair of closed containers, comprising means to initially establish atmospheric pressure in each of said containers, a pump connected to supply air to one container from the other and vice versa to build up the pressure therein from atmospheric to a predetermined standard pressure and means to measure the quantity of air thus supplied as an indication of said liquid level.

6. An apparatus for alternately measuring the liquid level in a pair of closed containers, comprising a compressor adapted to compress a given volume of air from atmospheric pressure so as to produce a standard pressure, means to establish atmospheric pressure in said containers, a pump connected to pump air from one container to the other to build up the pressure therein to said standard pressure, means to interrupt the operation of said pump when said standard pressure is reached and means to measure the total quantity of air supplied by said pump during said operation.

7. An apparatus for alternately measuring the liquid level in a pair of closed containers, comprising a compressor adapted to compress a given volume of air from atmospheric pressure so as to produce a standard pressure, means to establish atmospheric pressure in said containers, a pump connected to pump air from one container to the other to build up the pressure therein to said standard pressure, means to interrupt the operation of said pump when said standard pressure is reached, means to measure the total quantity of air supplied by said pump during said operation and timed means to thereafter reverse the operation of said pump for building up pressure in the other container so as to repeat the measuring operation for said other container.

8. An apparatus for alternately measuring the liquid level in a pair of closed containers, comprising first and second valves connected to vent the first and second containers, respectively, to the atmosphere, remote control means actuating said valves, a pump connected to pump air from one container to the other for purposes of measurement, means controlled by the operation of said pump to initially cause said remote control means to open said first valve for a period of time sufficient to establish atmospheric pressure in said first container and thereafter to close said valve to permit pressure to be built up in said container by said pump, a standard compressor adapted to effect a predetermined volume compression in air from atmospheric pressure to establish a standard air pressure, pressure responsive means to interrupt the operation of said pump when the pressure in said first container becomes equal to said standard pressure, means to measure the total amount of operation of said pump in producing said pressure and timed relay means to start said pump in the opposite direction for repeating said measuring operation with said second container.

9. An apparatus for alternately measuring the liquid level in a pair of closed containers, comprising a reversible pump connected to pump air from a first container to a second and vice versa for alternately building up air pressure in said containers, a standard compressor, means to actuate said compressor at each reversal of operation of said pump so as to build up a standard pressure, a first and second valve connected to vent the respective containers to the atmosphere, remote control means actuating said valves, switching means connected to control the operation of said pump, said switching means being actuated by said remote control means, means including means responsive to the pressure in said first container to cause said remote control means to actuate said second valve for establishing atmospheric pressure in said second container and for interrupting the operation of said pump when the pressure in said first container becomes equal to said standard pressure, and means including timing mechanism to close one of said switching means to start said pump in the opposite direction and thereafter close said second valve whereby air is pumped from said first container to said second container so as to repeat the measuring operation for said second container.

10. An apparatus for alternately measuring the liquid level in a pair of closed containers, comprising a reversible pump connected to pump air from a first container to a second and vice versa for alternately building up air pressure in said containers, a standard compressor, means to actuate said compressor at each reversal of operation of said pump so as to build up a standard pressure, a first and a second valve connected to vent the respective containers to the atmosphere, remote control means actuating said valves and switching means connected to control the operation of said pump, said switching means being actuated by said remote control means, means including means responsive to the pressure in said first container to cause said remote control means to actuate said second valve for establishing atmospheric pressure in said second container and for interrupting the operation of said pump when the pressure in said first container becomes equal to said standard pressure, means including timing mechanism to close one of said switching means to start said pump in the opposite direction and thereafter close said second valve whereby air is pumped from said first container to said second container so as to repeat the measuring operation for said second container, indicating means comprising a pair of pointers cooperating with scales to indicate the liquid level in the respective containers and a driver for said pointers connected to move said pointers an amount corresponding to the total operation of said pump during each measuring operation.

11. In a device for measuring the amount of liquid in a closed container having a space above said liquid, compressor means for supplying fluid to the space above the liquid, means indicating the quantity of said fluid supplied during a certain period and means responsive to the pressure in said tank for determining said period.

12. In a device for measuring the amount of liquid in a closed container having space above said liquid, means for supplying a fluid to said space, means for beginning the operation of said fluid supplying means, means sealing said container operative upon the beginning of operation of the fluid supplying means, means for indicating the quantity of fluid supplied by said supplying means and means responsive to a predetermined pressure in said container whereby said indicating means is stopped at its then indication.

13. In a device for measuring the quantity of liquid in a closed container, means supplying fluid to said container whereby the space is filled between said liquid and said container, pressure responsive means for controlling said fluid supplying means, means for continuously indicating the quantity of fluid supplied to said container and electrical means responsive to a predetermined position of said pressure responsive means for stopping said indicating means in its instant position.

14. In a device of the character described, a closed liquid container, compressor means connected to a source of air at atmospheric pressure for compressing a desired volume of said air to establish a standard pressure varying with atmospheric pressure changes, means supplying a compressible fluid to said container to establish a pressure therein, means for opposing said standard pressure and said established pressure, and means controlled by both said pressures for indicating the total fluid supplied to said container whereby a measurement of the amount of liquid in said container is obtained.

15. In a device of the character described, a pair of closed liquid containers, means for establishing atmospheric pressure in one of said containers, means for thereafter closing said container, means for pumping air from the other of said containers to said one container and means for measuring the quantity of air so pumped whereby an indication of the liquid level in said one container is obtained.

KARL SAUR.